Figure 1:
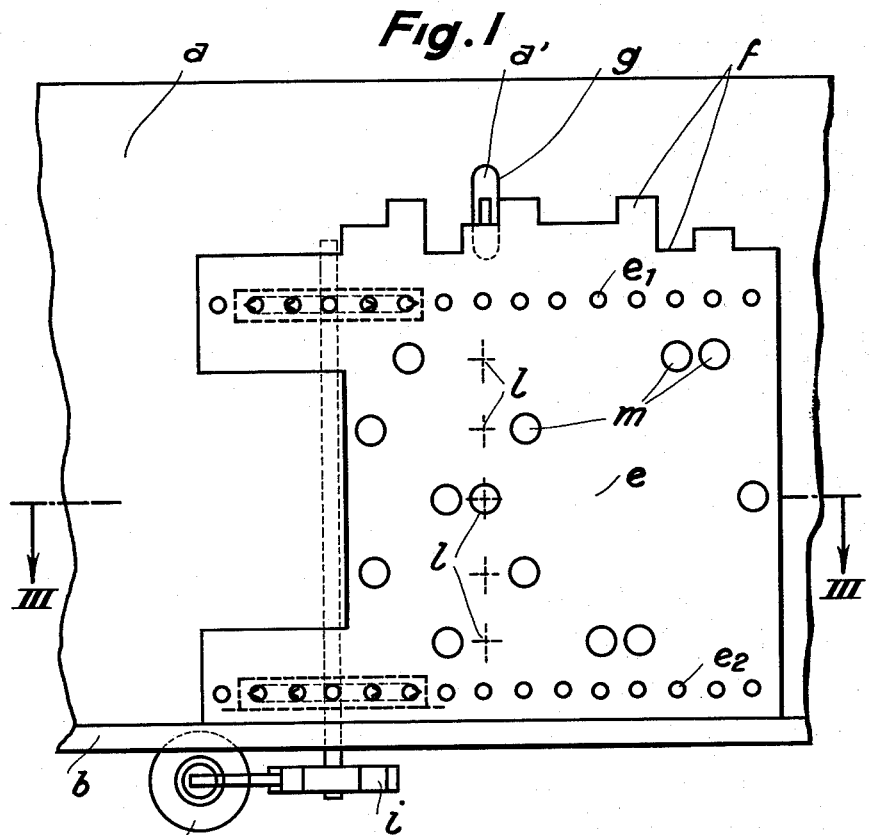

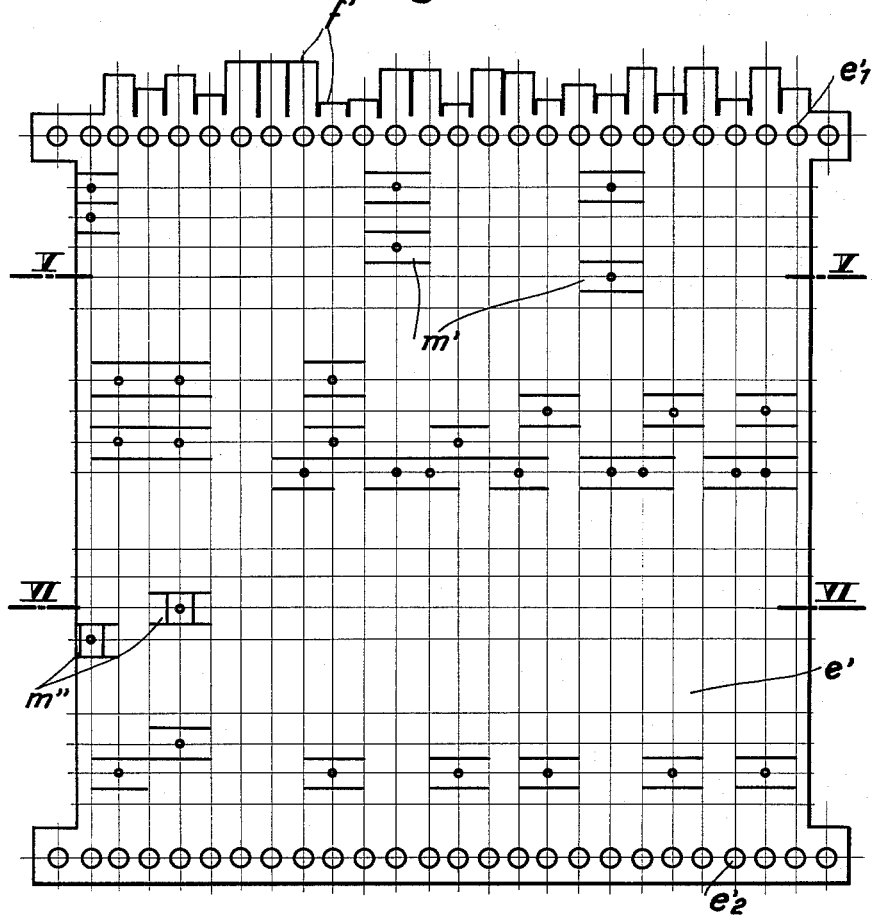
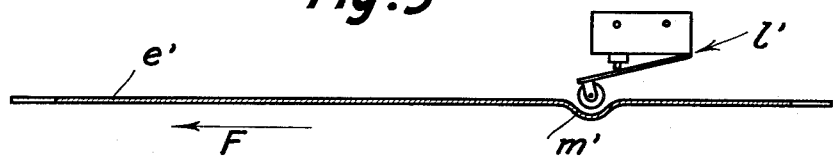
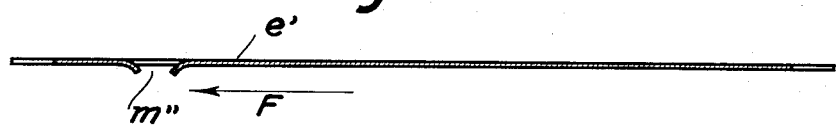

United States Patent Office 3,243,532
Patented Mar. 29, 1966

3,243,532
PROGRAM CARD READER
André de Bonduwe, Vanves, France, assignor to Societe Anonyme Etablissements de Bonduwe, Issy-les-Moulineaux, France, a corporation of France
Filed July 17, 1962, Ser. No. 210,361
Claims priority, application France, July 27, 1961, 869,296; July 2, 1962, 902,657
5 Claims. (Cl. 200—46)

This invention relates to improvements in programming means, which assure that a succession of operations, constituting the program or fixed cycle, is performed in a given order. These means not only assure that an operation is begun only after the time for the one or more preceding operations has elapsed but that these one or more operations have fulfilled all of the conditions necessary for their perfection.

There are already known means, based on Cartesian coordinates, and often using punched cards or boards, on which the orders are previously recorded in the form of perforations, scallops, or some kind of deformation, that are detected during passage of the card by various feelers or playback means, such as detectors and cells, for example.

A major disadvantage of these schemes is that the time taken for the card, moving at constant speed, to pass by the playback elements, is equal to the total duration of the different elementary operations and that the distance separating two successive items of information recorded on the card cannot be less than some value such that the pick-up of the two items be distinctly separated. As a result, the cards used are very long if the control cycle is of some duration. Moreover, unless these known machines are equipped with complicated accessories, they cannot reveal—and much less take into account—any anomaly cropping up during the cycle.

In seeking to solve these disadvantages, the applicant came upon the solution, which is the basis of the invention, to separate, on a Cartesian coordinate programming card, the control of time and the control of the starting of the different operations.

In order to obtain spatial separation of the two controls, the applicant has developed a card perforated for the successive or simultaneous operations that are to be performed by a machine, and having one of its edges, that is parallel to the direction of card movement, notched, the height or depth of which notches is proportional to the actual duration of the various operations corresponding to the perforations.

According to another embodiment of the invention, the card described above has, instead of the perforations, grooved or depressed areas, perforated or not, corresponding to the successive or simultaneous operations to be performed by the machine.

Besides notches or slots any other means can be provided for indicating the time. The card of the invention is preferably made of a rigid, abrasion resistant material, such as cardboard, plastic, or metal, and its length, as is evident from the above description, can be reduced to a minimum.

The invention also relates to apparatus for conveying the information recorded on the card to the machine intended to carry out its instructions. This apparatus essentially includes means for holding the card still while one operation, corresponding to a single perforation, or several operations, corresponding to several perforations, are performed.

Means for effecting a cycle of operations under such circumstances that one operation cannot be begun before the correct realization of the preceding one, essentially consisting, according to the invention, of a surface for holding the card; means for moving the card; means of any known type for playing back the card; means, such as a lever, resting upon the edge notch or slot corresponding to the perforation of the operation in process; means connecting the last means to a speed regulator, the motor of which cannot turn until the correct ending of any given operation, after which the rotation of the motor assures that the next slot will be engaged or interlocked by the lever.

The movement of the card is obtained by two toothed wheels mounted on the shaft of a ratchet actuated by impulses from an electromagnet. Some means, preferably a lever, driven by the same or a different electromagnet, is supported, at its free end, by the edge slots. This lever determines the position of the card, which, in turn, determines the rotational speed of the output shaft of the speed regulator. At each turn of the regulator, a cam, moved directly or indirectly by the output shaft, operates the electromagnets.

The cards and apparatus of the invention can be used in all automatic cyclic machines that are programmed, and particularly in washing machines, where the washing steps vary according to what is to be washed.

Figure 3:
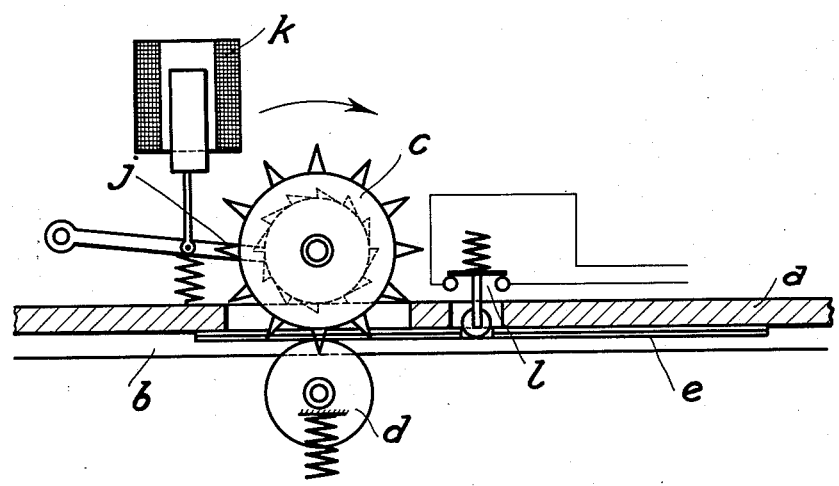
Figure 2:
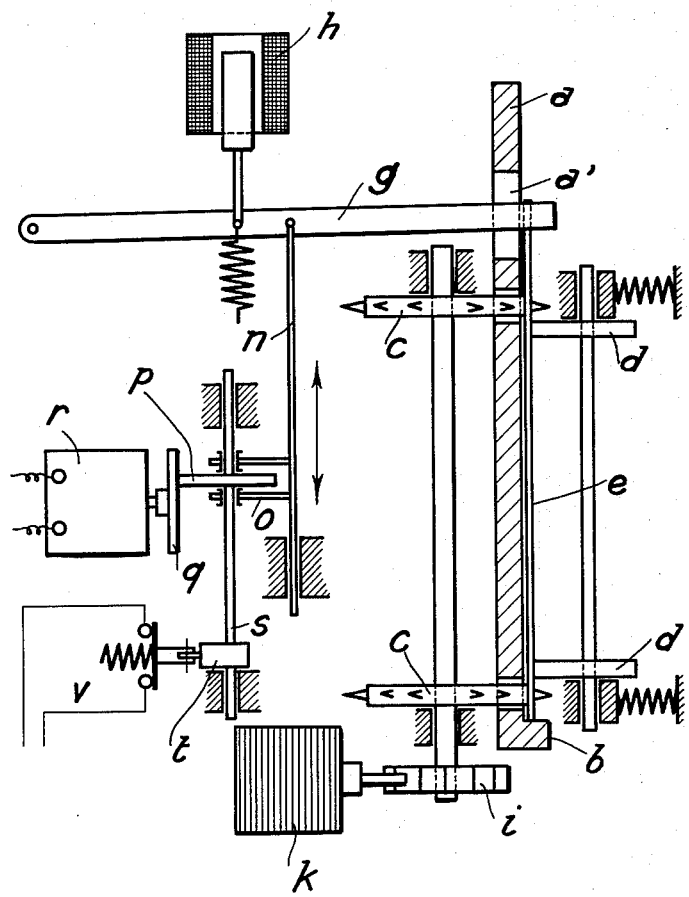

There shall now be described exemplary embodiments of the invention, with reference to the accompanying drawings, in which:

FIG. 1 is a front view of the programmer;
FIG. 2 is a side view of the apparatus;
FIG. 3 is a top view partly in section taken along III—III of FIGURE 1;
FIG. 4 is a top view of another embodiment of the card programmer;
FIG. 5 is a sectional view taken on line V—V of FIGURE 4;
FIG. 6 is a sectional view taken on line VI—VI of FIGURE 4.

Referring to FIGURE 1, card $e$ of the invention is supplied, on the one hand, with two parallel rows of drive holes or drive means $e_1$ and $e_2$ next to the upper and lower edge of the card and, on the other hand, with a number of operation perforations $m$ distributed in the plane of the card. Finally, there are the time notches $f$ cut in the upper edge of the card. The height of these notches, measured perpendicularly to the direction of card movement, is proportional to the duration of the operations controlled by the perforations $m$.

According to the embodiment of FIGURE 4, card $e'$ includes, as described above, two rows of holes or drive means $e'_1$ and $e'_2$, whereby the card is moved, and notches $f'$ for the time operations. But instead of perforations for the operations to be performed, there are provided grooves or depressions $m'$, in one embodiment, and $m''$, in another embodiment. Depressions $m'$ are not perforated, while the depressed portions $m''$ have square perforations, of which only the two edges parallel to the direction of card movement (arrow F in FIGURES 5 and 6) are raised and in the plane of the card, such that these two sides of the depression are open. The profiles of depressions $m'$ and $m''$ are shown in FIGURES 5 and 6, respectively.

The apparatus and its operation shall now be described.

Support surface $a$, carried by a frame (not shown), and having a guide wall $b$, receives the perforated card $e$, which may, for example, be a metal plate. Two spiked or toothed wheels $c$ respectively mesh with two rows $e_1$ and $e_2$ of drive holes. A plurality of pressure rollers $d$ of any desired number keep the card in position on support surface $a$. Drive wheels C are rigid with respect to a ratchet-wheel $i$ fixed to the shaft of the drive wheels. The ratchet-wheel is driven, through a set of levers, by a click $j$ that receives an impulse from an electromagent *k*. Each impulse from the electromagnet causes the program card to move a distance equal to the separation between two successive drive holes. A series of elecrical switches *l*, each having a roller, is arranged in back of surface *a*. The rollers extend through the support surface, whereby in a known manner, the rollers engage perforations *m* and so "read" the card.

In the embodiment of the FIGURES 4–6, the electrical switches *l'* in a similar fashion "read" the card, as the rollers pass over the depressed or perforated hollows or grooves.

In either embodiment, for each position of the card during its passage, one or more electrical contacts are open or closed.

A lever *g*, pivoting on any desired axle parallel to the card movement, is controlled by an electromagnet *h*. By means of an appropriate system of levers, this electromagnet can be replaced by *k*. Lever *g* passes through a slot *a'* and extends beyond support surface *a*. Each time that the lever falls it comes to rest on a notch *f* corresponding to the operation in process. While it falls, lever *g* drives a rod *n* fixed to the control of a speed regulator capable of large variations in speed. In the embodiment shown, *n* drives a guide fork *o* of a speed regulating friction wheel *p*. A small motor-speed reducer *r*, which is turned on and off by the position of electromagnet *h*, and cannot operate as long as the eletromagnet is energized, rotates drive disk *q* at a low constant speed. The speed regulator is advantageously of the kind disclosed in the patent application, "Speed Regulator," filed on the same day in the name of the applicant.

Output shaft *s* has at one end a cam *t*, which, for every turn, closes switch *v*, causing the armatures of electromagnets *h* and *k* to be pulled in, thereby stopping the motor and advancing the program card. The advancement, however, can also be caused by the automatic control for the proper performance of the operation in process, when the operation is not dependent on time.

Thus, it will be immediately seen that in the apparatus of the invention, that the time separating two successive movements of a card is a function either of the position of the wheel of the speed regulator *p*, and consequently of the height of notch *f* of the perforated card, or of the proper performance of the operation in process, or of both.

Successive perforations of the program card *e* can be set as close as possible, however long the operations corresponding to these perforations may take.

Card *e'* (FIG. 4) is advantageously used in machines where the operation must be flexible and continuous. The card feeler smoothly and progressively controls the starting up and ending of the one or more operations corresponding to the grooved or depressed areas, perforated or not, because of the gentle curve of these areas.

What I claim is:

1. An apparatus adapted to read a single program card having a first coded area for the operations to be performed and a second coded area for the time of each operation comprising, a support surface for said card,
   means for advancing said card along said surface,
   first means movable between a non-responsive position and at least one responsive position adjacent the second coded area of said card, the responsive position of said first means being controlled by said second coded area,
   rotatable shaft means,
   second means for driving said rotatable shaft means at a speed dependent on the longitudinal position of said first means which, in turn, is determined by said second coded area, said first means being connected to said second means and being capable of moving a portion of said second means whereby the output to, and the speed of rotation of, said second shaft means changes,
   third means for moving said first means to a position non-responsive to said second area code and for actuating the means for advancing said card,
   switching means for controlling the operation of said third means, and
   fourth means in engagement with said shaft means for opening and closing said switch means once every revolution of said shaft means, the closing of said switching means activating said third means and the time interval between each closing of said switch means being determined by the second coded area of said card.

2. The apparatus of claim 1, in which said fourth means is a cam means and said means for advancing and for rendering non-responsive includes at least one electromagnet means.

3. The apparatus of claim 2, in which said means for advancing includes a ratchet, actuated by said at least one electromagnet means whenever said switch is closed; and card drive means, driven by said ratchet.

4. The apparatus of claim 3, in which said card drive means includes two drive wheels engaging said card; and pressure means for holding said card on said support surface.

5. The apparatus of claim 1, in which said second means includes a motor, the operation of which is controlled by the position of said movable means.

References Cited by the Examiner
UNITED STATES PATENTS

| | | | |
|---|---|---|---|
| 2,639,340 | 5/1953 | Gaite | 200—46 |
| 3,104,292 | 9/1963 | Holzer | 200—46 |
| 3,125,672 | 3/1964 | Kull | 200—46 X |

ROBERT K. SCHAEFER, *Primary Examiner.*

KATHLEEN H. CLAFFY, *Examiner.*